United States Patent Office 2,978,379
Patented Apr. 4, 1961

2,978,379

CRYSTALLINE 21-DEOXY-9α-FLUORO 6α-METHYL PREDNISOLONE

John W. Shell, Kalamazoo, Mich., assignor to The Upjohn Company, Kalamazoo, Mich., a corporation of Delaware No Drawing. Filed May 21, 1959, Ser. No. 814,665

4 Claims. (Cl. 167—58)

This invention relates to a new polymorph and more particularly relates to a new polymorph of 21-desoxy-9α-fluoro-6-methylprednisolone.

21-desoxy-9α-fluoro-6-methylprednisolone is a recently developed corticosteroid exhibiting marked specificity of anti-inflammatory action on topical application. This specificity of topical action is demonstrated by the high (i.e., 40 to 1) 21-desoxy-9α-fluoro-6-methylprednisolone to hydrocortisone ratio of local anti-inflammatory activity as compared with the 1 to 1 21-desoxy-9α-fluoro-6-methylprednisolone to hydrocortisone ratio of oral activity. Because of the outstanding greater specific local over oral activity in the relatively small amount of this steroid required for local effect, 21-desoxy-9α-fluoro-6-methylprednisolone is unlikely to cause undesirable systemic effects due to possible absorption of hormone following topical application.

Due to its outstanding therapeutic properties, the development of more advantageous forms of 21-desoxy-9α-fluoro-6-methylprednisolone to improve therapeutic effectiveness is highly desirable.

It has now been discovered that this compound can be prepared in a new polymorphic form (hereinafter designated as polymorph II). This new polymorph is also unexpectedly more efficacious when made up into topical preparations than similar preparations made with the old polymorph (hereinafter designated as polymorph I).

The polymorph of the present invention can be distinguished from the old polymorph by comparison of interplanar spacings as shown by the following X-ray diffraction data:

INTERPLANAR SPACINGS, A.

| Polymorph I | Polymorph II |
|---|---|
| 8.54 | 8.66 |
| 6.73 | 6.91 |
| 6.37 | 6.30 |
| 5.75 | 5.88 |
| 5.48 | 5.75 |
| 5.23 | 5.50 |
| 4.99 | 5.14 |
| 4.62 | 4.65 |
| 4.23 | 4.31 |
| 4.10 | 4.00 |
| 3.90 | 3.71 |
| 3.69 | 3.52 |
| 3.62 | 3.29 |
| 3.47 | 3.16 |
| 3.23 | 3.08 |
| 2.98 | 2.98 |
| 2.89 | 2.91 |
| 2.79 | |
| 2.72 | |
| 2.63 | |
| 2.54 | |
| 2.49 | |
| 2.42 | |
| 2.34 | |
| 2.26 | |
| 2.18 | |
| 2.14 | |
| 2.08 | |
| 2.05 | |
| 1.92 | |

The foregoing X-ray data were obtained by the powder method using nickel filtered copper Kα radiation. The two polymorphs also differ in water solubility. Polymorph I has a water solubility of 0.010 mg./ml. at 25° C., and polymorph II has a water solubility of 0.034 mg./ml. at 25° C.

21-desoxy-9α-fluoro-6-methylprednisolone is an old compound, the method for the preparation of which is fully disclosed in U.S. Patent No. 2,867,637. However, the crystalline material disclosed in that patent is in the polymorphic form herein designated as I.

Illustratively, the polymorph of the present invention can be prepared from polymorph I by dissolving the compound in an organic solvent which will provide a solution capable of boiling at the prevailing pressure at a temperature in excess of about 280° C. and less than the decomposition melting point of the steroid (i.e., 292 to 303° C.). Suitable organic solvents include ethylene glycol or propylene glycol. The solution should be boiled almost to dryness and the resulting crystals collected before the solution is completely dry to avoid thermal degradation.

Polymorph II may be formulated by usual pharmaceutical techniques for therapeutic use. For example, the polymorph can be formulated into tablets, capsules, elixirs, syrups, ointments, powders, creams, lotions, eye drops, ear drops, pastes, jellies, injectable preparations, and the like. It is, of course, most advantageously used in those dosage forms where its greater topical specificity and effectiveness can be used to best advantage. Thus, ointments and creams are the preferred dosage forms for this polymorph.

For topical use, the polymorph is operative in a concentration between about 0.001 to about 5.0 percent. It can also be combined advantageously with coactive materials including antibiotics such as neomycin, bacitracin, polymyxin, nystatin, tetracycline and the like; antibacterial-antifungal substances such as vioform, parabens, iodophors and the like; antipruritics and local anesthetics such as camphor, menthol, benzocaine, calamine, and the like; and tissue stimulants such as ichthammol, allantoin and the like.

The following examples are illustrative of the processes and products of this invention and are not to be construed as limiting.

Example

One gram of polymorph I of 21-desoxy-9α-fluoro-6-methylprednisolone is dissolved in 2 ml. of hot ethylene glycol. The solution is heated at atmospheric pressure until most of the solvent is evaporated, and the resulting crystals are almost dry. The crystals are separated by filtration, washed with petroleum ether, and are characterized by the following X-ray diffraction data:

INTERPLANAR SPACINGS, A.

| | |
|---|---|
| 8.66 | 4.00 |
| 6.91 | 3.71 |
| 6.30 | 3.52 |
| 5.88 | 3.29 |
| 5.75 | 3.16 |
| 5.50 | 3.08 |
| 5.14 | 2.98 |
| 4.65 | 2.91 |
| 4.31 | |

The thus-prepared polymorph II can be formulated by conventional techniques into a suitable topical ointment containing the following ingredients per gram:

200 mg. wool fat U.S.P.
544.25 mg. white petrolatum U.S.P.
250 mg. white mineral oil U.S.P.
5.5 mg. neomycin sulfate U.S.P., micronized
0.25 mg. 21-desoxy-9α-fluoro-6-methylprednisolone, polymorph II If antibiotic activity is not desired, neomycin can be eliminated from the above formula. In either event, when applied by inunction twice a day to inflamed areas of skin, the polymorph II containing ointment exhibits a high degree of topical specificity and effectiveness.

The polymorph can also be formulated by conventional techniques into a suitable cream containing the following ingredients per gram:

4 mg. n-butyl-p-hydroxybenzoate
1 mg. methylparaben U.S.P.
160 mg. glyceryl monostearate
80 mg. spermaceti U.S.P.
0.25 mg. 21-desoxy-9α-fluoro-6-methylprednisolone, polymorph II
100 mg. polyethylene glycol 400 U.S.P.
q.s. ad deionized water When applied by inunction twice a day to inflamed areas of skin, the polymorph II containing cream exhibits a high degree of topical specificity and effectiveness.

It is to be understood that the invention is not to be limited to the exact details of operation or exact compositions shown and described herein as obvious modifications and equivalents will be apparent to one skilled in the art, and the invention is therefore to be limited only by the scope of the appended claims.

What is claimed is:

1. A new form of 21-desoxy-9α-fluoro-6α-methylprednisolone crystals characterized by increased solubility in water and the following X-ray diffraction data:

INTERPLANAR SPACINGS, A.

| | |
|---|---|
| 8.66 | 4.00 |
| 6.91 | 3.71 |
| 6.30 | 3.52 |
| 5.88 | 3.29 |
| 5.75 | 3.16 |
| 5.50 | 3.08 |
| 5.14 | 2.98 |
| 4.65 | 2.91 |
| 4.31 | |

2. A pharmaceutical preparation comprising a pharmaceutical carrier and 21-desoxy-9α-fluoro-6α-methylprednisolone crystals characterized by increased solubility in water and the following X-ray diffraction data:

INTERPLANAR SPACINGS, A.

| | |
|---|---|
| 8.66 | 4.00 |
| 6.91 | 3.71 |
| 6.30 | 3.52 |
| 5.88 | 3.29 |
| 5.75 | 3.16 |
| 5.50 | 3.08 |
| 5.14 | 2.98 |
| 4.65 | 2.91 |
| 4.31 | |

3. A pharmaceutical preparation comprising a topical pharmaceutical carrier and from about 0.001 to about 5 percent 21-desoxy-9α-fluoro-6α-methylprednisolone crystals characterized by greater topical effectiveness and the following X-ray diffraction data:

INTERPLANAR SPACINGS, A.

| | |
|---|---|
| 8.66 | 4.00 |
| 6.91 | 3.71 |
| 6.30 | 3.52 |
| 5.88 | 3.29 |
| 5.75 | 3.16 |
| 5.50 | 3.08 |
| 5.14 | 2.98 |
| 4.65 | 2.91 |
| 4.31 | |

4. A cream for the treatment of topical anti-inflammatory disorders comprising a topically acceptable cream base and 0.025 percent 21-desoxy-9α-fluoro-6α-methylprednisolone crystals characterized by greater topical effectiveness and the following X-ray diffraction data:

INTERPLANAR SPACINGS, A.

| | |
|---|---|
| 8.66 | 4.00 |
| 6.91 | 3.71 |
| 6.30 | 3.52 |
| 5.88 | 3.29 |
| 5.75 | 3.16 |
| 5.50 | 3.08 |
| 5.14 | 2.98 |
| 4.65 | 2.91 |
| 4.31 | |

References Cited in the file of this patent

UNITED STATES PATENTS 2,867,637    Lincoln et al.    Jan. 6, 1959